United States Patent [19]

Davis et al.

[11] Patent Number: 5,162,436
[45] Date of Patent: Nov. 10, 1992

[54] HEAT WELDABLE ROOF SHEETING AND METHOD FOR COATING ROOFS

[75] Inventors: James A. Davis, Uniontown; Joseph K. Valaitis, Brecksville, both of Ohio

[73] Assignee: Bridgestone/Firestone, Inc., Akron, Ohio

[21] Appl. No.: 594,461

[22] Filed: Oct. 4, 1990

[51] Int. Cl.$^5$ .............................................. C08L 53/00
[52] U.S. Cl. ........................................ 525/97; 525/99; 524/505
[58] Field of Search ................. 525/97, 99; 524/505; 428/517

[56] References Cited

U.S. PATENT DOCUMENTS

| | | | |
|---|---|---|---|
| 3,280,082 | 10/1966 | Natta et al. | 260/80.7 |
| 3,801,531 | 4/1974 | Berejka et al. | 260/33.4 |
| 3,867,247 | 2/1975 | O'Farrell et al. | 161/88 |
| 3,887,530 | 6/1975 | O'Farrell et al. | 525/344 X |
| 4,130,535 | 12/1978 | Coran et al. | 260/33.6 |
| 4,210,579 | 7/1980 | Grigo et al. | 525/97 X |
| 4,247,661 | 1/1981 | Herman et al. | 525/97 X |
| 4,355,139 | 10/1982 | Coran et al. | 525/133 |
| 4,435,466 | 3/1984 | Kuhnel et al. | 428/287 X |
| 4,480,012 | 10/1984 | Fieldhouse | 428/506 |
| 4,732,925 | 3/1988 | Davis | 524/426 |
| 4,767,658 | 8/1988 | Lorenz | 428/192 |
| 4,778,852 | 10/1988 | Futamura | 525/97 |
| 4,803,020 | 2/1989 | Valaitis et al. | 264/22 |
| 4,855,362 | 8/1989 | Muse, Jr. et al. | 525/194 |

OTHER PUBLICATIONS

Rubber-Thermoplastic Compositions, Part V. Selecting Polymers For Thermoplastic Vulcanizates-*Rubber Chem. Technology*, vol. 55, p. 116.

Primary Examiner—George F. Lesmes
Assistant Examiner—D. R. Zirker
Attorney, Agent, or Firm—Frank J. Troy, Sr.

[57] ABSTRACT

A self-adhering heat seamable sheet material for roofing prepared from an uncured polymeric composition of matter which comprises 100 parts by weight of a semi-crystalline polymer having more than about 2 percent by weight crystallinity and selected from the group consisting of polyolefins prepared from monomers containing at least 2 carbon atoms; from about 20 to 300 parts by weight of a filler selected from the group consisting of reinforcing and non-reinforcing materials and mixtures thereof per 100 parts of the polymer; and from about 20 to 150 parts by weight of a processing material and mixtrues thereof, per 100 parts of the polymer. A method for covering a roof comprises the steps of applying layers of self-adhering sheet material prepared from an uncured heat seamable polymeric composition of matter to the roof being covered; overlapping adjacent edges of the layers; heating the overlapped areas to about the softening point of the sheet material and seaming the overlapped areas under sufficient pressure to provide an acceptable seam. For practice of the method, a polymeric composition of matter is provided which is self-adhering and does not require the use of an adhesive.

5 Claims, No Drawings

HEAT WELDABLE ROOF SHEETING AND METHOD FOR COATING ROOFS

TECHNICAL FIELD

The present invention relates generally to sheeting material used for roofing. More particularly the sheeting material is comprised of ethylene-propylenediene terpolymer, referred to herein as EPDM, ethylene-propylene rubber, referred to herein as EPR, ethylene-butene copolymer or similar olefinic type polymer, and mixtures thereof. A method is also provided for covering roofs which includes the step of employing a self-adhering sheeting material of the present invention.

BACKGROUND OF THE INVENTION

Polymeric roof sheeting is used as single ply roofing membrane for covering industrial and commercial flat roofs. Such membranes are generally applied to the roof surface in vulcanized or cured state.

Because of outstanding weathering resistance and flexibility, cured EPDM based roof sheeting has been rapidly gaining acceptance. This material normally is prepared by vulcanizing the composition in the presence of sulfur or sulfur containing compounds such as mercaptans. Our earlier U.S. Pat. No. 4,803,020 also teaches the use of radiation crosslinking promoters in an EPDM sheeting composition which can be cured by ionizing radiation.

Notwithstanding the usefulness of radiation curing and sulfur curing, a disadvantage of utilizing these elastomers is the lack of adhesion of EPDM, especially cured EPDM, to itself. This is a serious problem because in applying EPDM sheets to a roof, it is usually necessary to splice the cured EPDM sheets together. This splice or seam area is subjected to both short term and long term stresses such as those caused by roof movement, heavy winds, freeze-thaw cycling and thermal cycling. Such stresses may manifest themselves in shear forces or peel forces, i.e., the seam peels back under severe stress conditions or results in a partially open seam (often referred to as a fish-mouth condition) under less severe conditions.

In view of the foregoing problem, it has been necessary to utilize an adhesive to bond the cured EPDM sheets together. As will be evident from the above discussion, an adhesive for bonding cured EPDM elastomer roofing sheets together must meet a number of requirements which are extremely difficult to satisfy. Thus, the adhesive must provide sufficient peel and adhesive strength to permit the splice formed by bonding the cured EPDM roofing sheets together to resist both the short term and long term stresses such as those discussed hereinabove. Moreover, the adhesive must be resistant to oxidation, hydrolysis and chemical attack from ponded water. Additionally, the adhesive must provide the important property often referred to in the adhesive art as "Quick Stick". The term "Quick Stick" means the characteristics of two sheets of material which have been coated with an adhesive composition to develop virtually immediate adhesive strength when placed in contact with each other.

Quick Stick is an extremely important property in an adhesive which is utilized to splice cured EPDM elastomer roofing sheets together. Thus, adhesive compositions presently known generally require anywhere from about two (2) to about seven (7) days at room temperature (i.e. 22° C.) to attain maximum adhesive strength. At higher ambient temperature, this time period may be somewhat less but at minimum it will generally be at least 24 hours. The conventional procedure for splicing the EPDM roofing sheets together is to make the splice within a relatively short period of time after the adhesive coating has been applied to each sheet, generally within 30 minutes but often less. Accordingly, the adhesive composition must provide sufficient immediate adhesive strength or Quick Stick to permit the splice to withstand stresses from winds, movement, handling by installers, etc. until the adhesive achieves its maximum strength which as indicated will generally take from two (2) to seven (7) days.

Commercial contact adhesives which are conventionally employed for bonding cured EPDM elastomer roofing sheets together generally consist of solutions of neoprene or neoprene-type or butyl or butyl-type polymers in aromatic or aromatic-aliphatic solvents containing 2-butanone often along with tackifying resins. However, such adhesives have not proven to be very satisfactory due to their lower than desirable peel adhesion strengths. Thus, the neoprene or butyl-type adhesives often provide peel adhesion values at 22° C. of only 1 to 2 pounds per linear inch.

Pressure sensitive and contact adhesive compositions containing neutralized, partially neutralized or unneutralized sulfonate elastomers, tackifying resins and organic solvents or organic solvent mixtures are known in the prior art as shown by U.S. Pat. Nos. 3,801,531 and 3,867,247.

U.S. Pat. No. 3,801,531 relates to pressure sensitive adhesive compositions which contain thiouronium derivatives of unsaturated elastomers or neutralized, partially neutralized or unneutralized sulfonated elastomers including sulfonated EPDM, tackifying resins including phenol formaldehyde or alkylphenol formaldehyde resins and organic solvents or organic solvent mixtures including a preferred 90:10 mixture of toluene and isopropyl alcohol. However, the patent does not disclose or suggest the use of alkylphenol or ethoxylated alkylphenols in such compositions.

U.S. Pat. No. 3,867,247 relates to adhesive contact cements which contain neutralized, partially neutralized or unneutralized sulfonated butyl elastomers, tackifying resins including phenol formaldehyde or alkylphenol formaldehyde resins and organic solvents or organic solvent mixtures including a preferred 90:10 mixture of toluene and isopropyl alcohol. However, the patent does not disclose or suggest the use of alkylphenols or ethoxylated alkylphenols in such compositions.

The adhesive compositions described in the aforementioned patents suffer from a significant disadvantage which materially limits their usefulness as a contact adhesive for bonding cured EPDM elastomer roofing sheets together and that is their deficiency in Quick Stick properties.

One such adhesive system for EPDM elastomers that provides good Quick Stick is described in U.S. Pat. No. 4,480,012, owned by the Assignee of record herein. Such adhesives comprise a neutralized sulfonated EPDM elastomeric terpolymer; an organic hydrocarbon solvent; a para-alkylated phenol formaldehyde tackifying resin and an alkylphenol or ethoxylated alkylphenol. While the use of such adhesive compositions is an effective means of joining and sealing the edges of elastomeric roofing material, if the use of adhesives could be eliminated, the additional labor material costs and related hardware necessary to apply the adhesive would effect a significant cost savings. Moreover, elimination of the need to cure the material prior to its application to a roof would also be advantageous.

SUMMARY OF THE INVENTION

It is thus an object of the present invention to provide self-adhering heat seamable EPDM and EPR roof sheeting materials that need not be cured.

It is another object of the present invention to provide self-adhering heat seamable EPDM and EPR roof sheeting materials which eliminate the need for a solvent-based splicing adhesive and the related labor and hardware necessary for mixing and application thereof.

It is still another object of the present invention to provide a method for covering roofs which employs self-adhering heat seamable EPDM, EPR or other olefin type polymers as roof sheeting materials which do not necessarily require curing and which can be joined and seamed together at their edges without the use of adhesives.

In general the present invention relates to a self-adhering heat seamable sheet material for roofing prepared from an uncured polymeric composition of matter comprising 100 parts by weight of a semi-crystalline polymer having more than about 2 percent by weight crystallinity and selected from the group consisting of polyolefins prepared from monomers containing at least 2 carbon atoms; from about 20 to 300 parts by weight of a filler selected from the group consisting of reinforcing and non-reinforcing materials and mixtures thereof per 100 parts of the polymer; and from about 20 to 150 parts by weight of a processing material and mixtures thereof per 100 parts of the polymer.

A method for covering a roof is also provided and comprises the steps of applying layers of self-adhering sheet material prepared from an uncured heat seamable polymeric composition of matter to the roof being covered; overlapping adjacent edges of the layers; heating the overlapped areas to about the softening point of the sheet material; and seaming the overlapping areas under sufficient pressure to provide an acceptable seam strength, the composition of matter having sufficient self-adhesion, without the use of an adhesive.

At least one or more of the foregoing objects which shall become apparent to those skilled in the art are described in greater detail with reference to the specification which follows.

PREFERRED EMBODIMENT OF THE INVENTION

As noted hereinabove, the roof sheeting materials of the present invention comprise EPDM, EPR or other similar olefin type polymers. The term EPDM is used in the sense of its definition as found in ASTM-D-1418-85 and is intended to mean a terpolymer of ethylene, propylene and a diene monomer with the residual unsaturation portion of the diene in the side chain. Illustrative methods for preparing such terpolymers are found in U.S. Pat. No. 3,280,082 the disclosure of which is incorporated herein by reference. The preferred polymers having from about 60 to about 95 weight percent ethylene and from about zero to about 12 weight percent of the diene with the balance of the polymer being propylene or some other similar olefin type polymer.

The diene monomer utilized in forming the EPDM terpolymer is preferably a non-conjugated diene. Illustrative examples of non-conjugated dienes which may be employed are dicyclopentadiene, alkyldicyclopentadiene, 1,4-pentadiene, 1,4-hexadiene, 1,5-hexadiene, 1,4-heptadiene, 2-methyl-1,5-hexadiene, cyclooctadiene, 1,4-octadiene, 1,7-octadiene, 5-ethylidene-2-norbornene, 5-n-propylidene-2-norbornene, 5-(2-methyl-2-butenyl)-2-norbornene and the like. A typical EPDM is Vistalon ® MD-744 (Exxon Chemical Co.) a terpolymer having a Mooney Viscosity (ML/4 at 125° C.) of about 52; an ethylene/propylene (E/P) ratio of 61/39 weight percent and 2.7 weight percent of unsaturation.

Particularly useful and preferred EPDM materials include Royalene ® 375 (Uniroyal Chemical Co.); and EPsyn ® 5508 (Copolymer Rubber & Chemical Corporation). Royalene ® 375 has a Mooney Viscosity (ML/4 at 125° C.) of about 50.8; an E/P ratio of 75/25 weight percent and about 2.0 weight percent of unsaturation (dicyclopentadiene). EPsyn ® 5508 has a Mooney Viscosity (ML/4 at 125° C.) of about 55.6; and E/P ratio of 73/27 weight percent and about 3.7 weight percent of unsaturation. An experimental polymer, having a Mooney Viscosity (ML/4 at 125° C.) of about 56.1; an E/P ratio of 71/29 weight percent and about 1.7 weight percent of unsaturation (5-ethylidene-2-norbornene) was also employed.

The term EPR is used in the sense of its definition as found in ASTM D-1418-85 and is intended to means a copolymer of ethylene and propylene. The preferred copolymers contain from about 60 to 95 weight percent ethylene with the balance to total 100 weight percent being propylene. A typical EPR is Vistalon ® 719 (Exxon Chemical Co.) having an E/P ratio of about 75/25 weight percent.

To be useful as a roofing material in the present invention it is necessary that the EPDM have at least about 2 weight percent crystallinity, from the ethylene component; an $\overline{M}n$ as measured by GPC of at least about 30,000 and an $\overline{M}w$, as measured by GPC of at least about 100,000. Similarly, the EPR should have at least about 2 weight percent crystallinity (ethylene); an $\overline{M}n$, as measured by GPC of at least about 30,000 and an $\overline{M}w$, as measured by GPC of at least about 100,000. We have found that the selection of an EPDM or EPR having high crystallinity (at least 2 percent by weight) and a weight average molecular weight of at least 100,000 is necessary to provide a roofing material which does not require curing prior to application, if ever, and which does not require any type of adhesive, solvent-based or the like, to join and seam spliced edges.

Also, useful as a roofing material in the present invention is a copolymer of ethylene and butene. This particular copolymer has about 82 weight percent ethylene with the balance to total 100 weight percent being butene. A typical ethylene/butene copolymer is GERS-1085 (Union Carbide Corporation) having an $\overline{M}w$, as measured by GPC of at least about 221,000. Other similar olefinic polymers (e.g., ethylene/octene copolymer) can be used to practice this invention. Generally speaking any semi-crystalline polymer having more than about 2 percent by weight crystallinity and selected from the group consisting of polyolefins prepared from monomers containing at least 2 carbon atoms can be employed. For purposes of discussion herein, references to EPDM, EPR or similar olefinic polymers is intended to include any of the semi-crystalline polymers of the present invention.

The composition or compound employed to form the roof sheeting material comprises 100 parts by weight of EPDM, EPR, or other similar olefinic type copolymers, including mixtures of two or more types, to which is added basically fillers and processing materials as well as optionally other components including curatives, all of which are discussed hereinbelow.

With respect first to the filler, suitable fillers are selected from the group consisting of reinforcing and non-reinforcing materials, and mixtures thereof, as are customarily added to rubber. Examples include such materials as carbon black, ground coal, calcium carbonate, clay, silica, cryogenically ground rubber and the like. Generally, preferred fillers include carbon black, ground coal and cryogenically ground rubber.

Carbon black is used in an amount of about 20 parts to about 300 parts per 100 parts of polymer (phr), preferably in an amount of about 60 to about 150 phr. The preferred range of carbon black herein (60 to 150 phr) is about equal to the amount of carbon black normally used in preparing sulfur cured EPDM roof sheeting. The carbon black useful herein is any carbon black. Preferred are furnace blacks such as GPF (general purpose furnace), FEF (fast extrusion furnace) and SRF (semi-reinforcing furnace).

The ground coal employed as a filler in the compositions of the invention is a dry, finely divided black powder derived from a low volatile bituminous coal. The ground coal has a particle size ranging from a minimum of 0.26 microns to a maximum of 2.55 microns with the average particle size of 0.69±0.46 as determined on 50 particles using Transmission Electron Microscopy. The ground coal produces an aqueous slurry having a pH of about 7.0 when tested in accordance with ASTM D-1512. A preferred ground coal of this type is designated Austin Black which has a specific gravity of 1.22±0.03, an ash content of 4.58% and a sulfur content of 0.65%. Austin Black is commercially available from Coal Fillers, Inc., P.O. Box 1063, Bluefield, Va. Amounts range from about 5 to 65 phr with about 15 to 35 being preferred.

Finally, essentially any cryogenically ground rubber may be employed as a filler in the composition of the invention. The preferred cryogenically ground rubbers are cryogenically ground EPDM, butyl, neoprene and the like. A preferred cryogenically ground rubber is a cryogenically ground EPDM rubber. The preferred cryogenically ground EPDM rubber is a fine black rubbery powder having a specific gravity of 1.129±0.015 and a particle size ranging from about 30 to about 300 microns with an average particle size ranging from about 50 to about 80 microns. Amounts range from about 5 to 40 phr with about 10 to 25 being preferred.

Mixtures of Austin black and cryogenically ground rubber useful herein may be utilized as a partial replacement for carbon black. Where mixtures of these two fillers are employed the relative amounts thereof can be widely varied; the overall total not exceeding about 60 phr. The ratio of Austin black to cryogenically ground rubber may range from a desired ratio of 2:1 to perhaps even a ratio of 3:1. Again, as noted hereinabove, other filler materials can be employed. Amounts thereof fall within the range of amounts normally employed in preparing sulfur cured conventional roof sheeting.

With respect to the processing material, it is included to improve the processing behavior of the composition (i.e. reduce mixing time and increase rate of sheet forming and includes processing oils, waxes and the like). The processing material is included in an amount ranging from about 20 parts to about 150 parts processing material per 100 parts EPDM ingredient phr, preferably in an amount ranging from about 60 parts to about 100 phr. A preferred processing material is a paraffinic oil, e.g. Sunpar 2280 which is available from the Sun Oil Company. Other petroleum derived oils including naphthenic oils may be used.

Optional ingredients include, for example, other elastomers (e.g., butyl elastomer, neutralized sulfonated EPDM, neutralized sulfonated butyl) in place of minor amounts of the EPDM, secondary inorganic fillers (e.g., talc, mica, clay, silicates, whiting) with total secondary filler content usually ranging from about 10 to about 150 phr, and conventional amounts of other conventional agents, such as zinc oxide, stearic acid, antioxidants, antiozonants, flame retardants, and the like.

Regarding curatives, sulfur is preferred in amounts of about 0.3 to 2 phr. As noted hereinabove, the roof sheeting compound is not cured prior to application and needed not be cured subsequent thereto. The presence of sulfur enhances bonding of the seams.

The compounding ingredients can be admixed, utilizing an internal mixer (such as a Banbury mixer), an extruder, and/or a two-roll mill, or other mixers suitable for forming a viscous relatively uniform admixture. When utilizing a type B Banbury internal mixer, in a preferred mode, the dry or powdery materials such as carbon black are added first followed by the liquid process oil and finally the polymer (this type of mixing can be referred to as an upside-down mixing technique).

The resulting admixture is sheeted to thicknesses ranging from 5 to 200 mils, preferably from 35 to 60 mils, by conventional sheeting methods, for example, milling, calendering or extrusion. Preferably, the admixture is sheeted to at least 40 gauge (0.040 inches) which is the minimum thickness specified in standards set by the Roofing Council of the Rubber Manufacturers Association for non-reinforced black EPDM rubber sheets for use in roofing applications. In many cases, the admixture is sheeted to 40-45 gauge thickness since this is the thickness for a large percentage of "single-ply" roofing membranes used commercially. The sheeting can be cut to desired length and width dimensions at this time.

The method of the present invention is practiced by utilizing an EPDM or EPR sheet material as described herein. As the sheet is unrolled over the roof substructure in an otherwise conventional fashion, the seams of adjacent sheet layers are overlapped. The width of the seam can vary depending on the requirements specified by the architect, building contractor or roofing contractor and thus, do not constitute a limitation of the present invention.

Assuming an overlap of several inches, the next step is to apply heat and pressure to the edge area to form the seam. Temperature is conveniently applied from about 80° to 550° C. Generally, the seam area, comprising overlapping edges of adjacent sheets, should be heated to about the softening point of the sheet material. Numerous techniques which utilize heat and pressure can be used to produce an effective seam as are known to those skilled in the art. Pressure can vary widely from a minimum of about 3 psi up to about 60 psi, typically so long as it is adequate to provide an acceptable seam strength.

In order to demonstrate practice of the present invention, several EPDM compounds were prepared and subjected to both peel and shear adhesion tests, as will now be set forth in detail. The EPDM polymers selected included Royalene ® 375; Vistalon ® MD-744 and an experimental EPDM terpolymer. One EPR polymer, Vistalon ® 719, was also employed, characterization of each of the polymers is presented in Table I hereinbelow.

TABLE I

| Polymer Characterization Study | | | | | |
|---|---|---|---|---|---|
| | Royalene ® 375 | Vistalon ® 719 | Vistalon ® MD-744 | Exp. EPDM | GERS 1085 |
| ML/4 at 125° C. | 51 | — | 53 | 56.1 | 30 |
| Ethylene Content, wt % | 76 | 75 | 60 | 71 | 82 |
| Crystallinity, wt % | 14.6 | 16.8 | <1 | 15.3 | 2.3 |
| Tg, °C. (by DSC) | −50.6 | −43.1 | −56.4 | −47 | −64.6 |
| Tm, °C. (by DSC) | 49.3 | 60.5 | 41.6 | 44.4 | 45, 70.3 |
| Unsaturation, % | 2.0 | — | 2.7 | 1.7 | — |
| Type of unsaturation | DCPD[a] | — | ENB[b] | ENB[b] | — |
| Mn | 69,500 | 38,200 | 73,200 | — | 49,100 |
| Mw | 190,300 | 83,100 | 360,400 | — | 221,700 |
| Mn/Mw ratio | 2.85 | 2.8 | 4.92 | — | 4.52 |

[a] dicyclopentadiene
[b] 5-ethylidene-2-norbornene

The polymers in Table I, except for Vistalon ® MD-744 and GERS-1085 (ethylene/butene copolymer), differ from other commercially available EPDM's (i.e., Royalene ® 3180, Royalene ® 2859, Vistalon ® 2200, etc.), in that, they are highly crystalline, high ethylene containing polymers. However, many of the other polymer properties listed above are similar to most of the commercially available EPDM terpolymers.

The following examples are submitted for the purpose of further illustrating the nature of the present invention and are not to be considered as a limitation on the scope thereof.

TABLE II

| Semi-Crystalline Polymers in a Heat Seamable Membrane | | | | | | |
|---|---|---|---|---|---|---|
| | Example No. | | | | | |
| | 1* | 2 | 3 | 4 | 5 | 6 |
| Royalene ® 375 | — | 100 | 100 | — | — | — |
| Vistalon ® MD-744 | 100 | — | — | — | — | — |
| DE-249 | — | — | — | 100 | 100 | — |
| GERS-1085 | — | — | — | — | — | 100 |
| HiStr GPF black | 130 | 128 | 128 | 130 | 128 | 128 |
| Sunpar 2280 oil | 88 | 90 | 90 | 90 | 90 | 90 |
| Sulfur | 0.90 | — | 0.60 | — | — | — |
| Austin black | — | 16 | 16 | — | 16 | 16 |
| Zinc oxide | 4 | — | — | — | — | — |
| Stearic acid | 1 | — | — | — | — | — |
| Curing Ingredients | 3.30 | — | — | — | — | — |
| Total | 327.2 | 334.00 | 334.6 | 320.0 | 334.0 | 334.0 |

*Sulfur cured EPDM membrane

In the examples illustrated in Table II, Example No. 1 provided a sulfur cured black EPDM membrane as the control. It was prepared utilizing standard rubber mixing techniques and equipment by mixing together the following ingredients: 100 parts EPDM terpolymer, 130 phr carbon black, 88 phr paraffinic process oil, 4 phr zinc oxide, 1 phr stearic acid, 0.9 phr sulfur and 3.3 phr rubber curing ingredients. The remaining examples Nos. 2-6 comprised only the elastomer, fillers and processing oil to provide compounds that could be sheeted and tested without curing, although Example No. 3 did contain 0.6 phr sulfur to enhance seam strength. Formulations for each appear in Table II, hereinbelow with all parts per hundred parts of rubber hydrocarbon (phr) by weight, unless otherwise specified.

DETAILED PEEL AND SHEAR ADHESION TEST PROCEDURE

Each of the above rubber compounds was subjected to adhesion testing which necessitated the building of test pads comprising 6×6 inch sheets reinforced by a fiber reinforcement scrim, according to the following procedure:

1. A 10×20-inch two roll mill was utilized to prepare a number of 6×6-inch sheets of rubber approximately 40 mils in thickness for building adhesion test pads.
2. In order to reinforce the uncured sheets of rubber, a 6×6-inch sheet of PVC treated polyester scrim (10×10 epi cord construction) was inserted between two 6×6-inch sheets of rubber.
3. The rubber-scrim assembly was covered with a layer of a Mylar film and placed in the cavity of a metal curing mold (6×6×0.075-inch).
4. The rubber-scrim assembly was then pressed in a Mylar film for about five minutes at about 149° C.
5. Two of the 6×6-inch scrim reinforced rubber pads were seamed together using a hand-held heating gun (Leister). Approximately 15 to 18 pounds force was supplied by means of a roller such as a standard two-inch wide metal roller. Satisfactory seams (either peel or shear) could be formed using only 3 to 4 pounds force and the standard two-inch wide rubber roller. The seams were allowed to equilibrate for 24 hours before testing.
6. A clicker machine with a one-inch wide die was utilized to prepare a number of test specimens for seam peel (Type B, 90° peel) and shear (Type A, 180° peel) adhesion testing.
7. Testing machine: Model 1130 Instron Universal Tester-a testing machine of the constant rate-of-jaw separation type. The machine was equipped with suitable grips capable of clamping the specimens firmly and without slippage throughout the tests.

8. The one-inch wide specimens were tested at the rate (both crosshead and chart speed) of two inches per minute using the adhesion test set forth in ASTM D-413 (machine method). Both peel and shear adhesion strength were determined at room temperature (i.e., 23° C.) as well as occasionally at 70° and 100° C. Specimens were allowed 15 minutes to preheat prior to testing at elevated temperatures.

9. Adhesion strength is defined as:

peel adhesion strength (lbs/inch) = pounds force x sample width;

shear adhesion strength (lbs/square inch) = pounds force x sample width.

Physical properties of each of the rubber compounds were measured and have been reported in Table III hereinbelow.

The uncured black and oil filled membranes featuring these semicrystalline polymers were characterized, for the most part, as lower modulus compositions having unaged die C tear and hardness properties similar to the sulfur cured EPDM membrane. Unaged peel adhesion tests and shear adhesion were also conducted, utilizing the test pads discussed hereinabove, and are reported in Tables IV–IX. Adhesion tests conducted with the sulfur cured EPDM membrane of Example No. 1 included the use of a butyl based lap splice adhesive, SA-1065, available from Uniroyal Chemical Co. Peel and shear adhesion at increasing temperatures for Example No. 1, the sulfur cured control, are reported in Tables IV and V hereinbelow. Adhesion tests conducted with Examples No. 2–6, utilized to form the test pads, are reported in Tables VI–IX, respectively. Crosshead and chart speeds for all adhesion tests were conducted at the rate of two inches per minute (ipm). Aged stress-strain and die C tear test results have been reported in Table X.

TABLE IV

Peel Adhesion Study of Sulfur EPDM Membrane Utilizing an Adhesive

| | |
|---|---|
| Membrane seam interply peel adhesion at 23° C. | |
| Unaged seams | |
| lbs/inch | 13.00 |
| type of failure | adhesive |
| Membrane seam interply peel adhesion at 50° C. - 15 minute preheat at 50° C. | |
| Unaged seams | |
| lbs/inch | 7.25 |
| type of failure | adhesive |
| Membrane seam interply peel adhesion at 70° C. - 15 minute preheat at 70° C. | |
| Unaged seams | |
| lbs/inch | 1.2 |
| type of failure | adhesive |
| Membrane seam interply peel adhesion at 82° C. - 15 minute preheat at 82° C. | |
| Unaged seams | |
| lbs/inch | 1 |
| type of failure | adhesive |
| Membrane seam interply peel adhesion at 100° C. - 15 minute preheat at 100° C. | |
| Unaged seams | |
| lbs/inch | 0.85 |
| type of failure | adhesive |

TABLE V

Seam Shear Strength of Sulfur Cured EPDM Membrane Utilizing an Adhesive

| | |
|---|---|
| Membrane seam shear strength at 23° C. | |
| Unaged seams | |
| lbs/square inch | 27.25 |
| type of failure | adhesive |
| Membrane seam shear strength at 50° C. - 15 minute preheat at 50° C. | |
| Unaged seams | |
| lbs/square inch | 18.5 |
| type of failure | adhesive |
| Membrane seam shear strength at 70° C. - 15 minute preheat at 70° C. | |
| Unaged seams | |
| lbs/square inch | 11.5 |
| type of failure | adhesive |
| Membrane seam shear strength at 82° C. - 15 minute preheat at 82° C. | |
| Unaged seams | |
| lbs/square inch | 9.5 |
| type of failure | adhesive |
| Membrane seam shear strength at 100° C. - 15 minute preheat at 100° C. | |

TABLE III

Unaged Physical Properties of Semi-Crystalline Polymers in a Heat Seamable Membrane

| | Example No. | | | | | |
|---|---|---|---|---|---|---|
| | 1* | 2 | 3 | 4 | 5 | 6 |
| Stress-Strain Properties at 23° C. | | | | | | |
| 100% Modulus, psi | 470 | 300 | 340 | 280 | 270 | 535 |
| 300% Modulus, psi | 1120 | 650 | 765 | 625 | 600 | — |
| Tensile at break, psi | 1435 | 890 | 910 | 840 | 855 | 660 |
| Elongation at break, % | 420 | 500 | 470 | 515 | 565 | 180 |
| Low Strain Modulus at 23° C. 10% Modulus, psi | 65 | 80 | 85 | — | — | 140 |
| Low Strain Modulus at 70° C. 10% Modulus, psi | 45 | 4 | 10 | — | — | 48 |
| Die C Tear at 23° C. Lbs/inch | 221 | 203 | 201 | 210.5 | 182 | 134 |
| Shore "A" hardness Tested at 23° C. | 64 | 61 | 65 | 66 | 65 | 72 |

*Sulfur cured EPDM membrane

Peel adhesion as shown in Table IV for the sulfur cured EPDM membrane at 23° C. was 13 pounds/inch, while seam shear strength at 23° C. in Table V was 28 pounds/square inch. A substantial reduction in both peel and shear adhesion resulted when the one-inch wide test samples were tested at elevated temperatures (i.e., 82° C. and 100° C.). In all instances, failure during testing occurred at the interface of the seam. Test failures of this type are commonly referred to as adhesive failures.

TABLE V-continued

Seam Shear Strength of Sulfur Cured EPDM Membrane Utilizing an Adhesive

| Unaged seams | |
|---|---|
| lbs/square inch | 7.75 |
| type of failure | adhesive |

TABLE VI

Peel Adhesion Study of Test Pads Comprising Semi-Crystalline Polymers at 23° C.

| | Example No. | | | | |
|---|---|---|---|---|---|
| | 2 | 3 | 4 | 5 | 6 |
| Heat setting #6 (260° C.) | | | | | |
| Lbs/inch | 6.5 | 6 | >60 | >58 | 4.5 |
| Type of failure | (A, B) | (A) | (B, C, D) | (B, C, D) | (A) |
| Heat setting #8 (425° C.) | | | | | |
| Lbs/inch | >19 | 20 | >33 | >59 | 16.5 |
| Type of failure | (B) | (A) | (B, C, D) | (B, C, D) | (A) |
| Heat setting #10 (550° C.) | | | | | |
| Lbs/inch | 21.5 | 43 | — | — | 15.5 |
| Type of failure | (A, B) | (A) | — | — | (A) |

(A) = Failure or separation between plies. (Weld failure)
(B) = Some tearing at interface, followed by rubber separating from the fabric reinforcement
(C) = Rubber tearing to fabric reinforcement
(D) = Necking-membrane stretching adjacent to the seam

TABLE VII

Shear Strength of Test Pads Comprising Semi-Crystalline Polymers at 23° C.

| | Example No. | | | | |
|---|---|---|---|---|---|
| | 2 | 3 | 4 | 5 | 6 |
| Heat setting #6 (260° C.) | | | | | |
| Lbs/square inch | 42.5 | 42.5 | >77 | >66 | 43.5 |
| Type of failure | (A, B) | (A) | (B, C, D) | (B, C, D) | (A) |
| Heat setting #8 (425° C.) | | | | | |
| Lbs/square inch | >49.5 | 51 | >65 | >86 | 43 |
| Type of failure | (B) | (A) | (B, C, D) | (B, C, D) | (A) |
| Heat setting #10 (550° C.) | | | | | |
| Lbs/square inch | >61.5 | >34 | — | — | 42 |
| Type of failure | (A, B) | (A) | — | — | (A) |

(A) = Failure of separation between plies. (Weld failure)
(B) = Some tearing at interface, followed by rubber separating from the fabric reinforcement
(C) = Rubber tearing to fabric reinforcement
(D) = Necking-membrane stretching adjacent to the seam

TABLE VIII

Shear Strength of Test Pads Comprising Semi-Crystalline Polymers at 70° C.

| | Example No. | | | | |
|---|---|---|---|---|---|
| | 2 | 3 | 4 | 5 | 6 |
| Heat setting #6 (260° C.) | | | | | |
| Lbs/square inch | >21 | >22 | — | — | 30.5 |
| Type of failure | (B) | (B) | — | — | (A) |
| Heat setting #8 (425° C.) | | | | | |
| Lbs/square inch | >22 | >21 | — | — | >37.5 |
| Type of failure | (B) | (B) | — | — | (B) |
| Heat setting #10 (550° C.) | | | | | |
| Lbs/square inch | >19 | >22 | — | — | 37 |
| Type of failure | (B) | (B) | — | — | (A) |

(A) = Failure of separation between plies. (Weld failure)
(B) = Some tearing at interface, followed by rubber separating from the fabric reinforcement
(C) = Rubber tearing to fabric reinforcement
(D) = Necking-membrane stretching adjacent to the seam

TABLE IX

Shear Strength of Test Pads Comprising Semi-Crystalline Polymers at 100° C.

| | Example No. | | | | |
|---|---|---|---|---|---|
| | 2 | 3 | 4 | 5 | 6 |
| Heat setting #6 (260° C.) | | | | | |
| Lbs/square inch | >12 | 8.5 | — | — | 5.5 |
| Type of failure | (B) | (A, B) | — | — | (A) |
| Heat setting #8 (425° C.) | | | | | |
| Lbs/square inch | >13.5 | >16 | — | — | 27.5 |
| Type of failure | (B) | (B) | — | — | (A) |
| Heat setting #10 (550° C.) | | | | | |
| Lbs/square inch | >12.5 | >21.5 | — | — | 23.5 |
| Type of failure | (B) | (B) | — | — | (A) |

(A) = Failure of separation between plies. (Weld failure)
(B) = Some tearing at interface, followed by rubber separating from the fabric reinforcement
(C) = Rubber tearing to fabric reinforcement
(D) = Necking-membrane stretching adjacent to the seam As can be determined from the data presented in Tables IV-IX, peel adhesion and shear adhesion values were generally significantly better than for the sulfur cured EPDM membrane (control) thereby demonstrating that the use of semicrystalline polymers allows the formation of seams without the use of adhesives. Testing of the EPR elastomer (Vistalon ® 719) was not possible because the elastomer could not be compounded with high levels of carbon black and processing oil due primarily to the low weight average molecular weight of less than 100,000.

Accelerated heat aging tests were next conducted to determine the influence of elevated temperature on the physical properties of the uncured membrane. An oven aged test was employed by placing the unreinforced rubber sheets in a forced air oven at 116° C. for 28 days. Test results are reported in Table X, hereinbelow.

TABLE X

Effect of Heat Aging on the Physical Properties of Semi-Crystalline Polymers in a Heat Seamable Membrane

| | Example No. | | | | | |
|---|---|---|---|---|---|---|
| | 1* | 2 | 3 | 4 | 5 | 6 |
| Stress-Strain Properties at 23° C. | | | | | | |
| 200% Modulus, psi | 1165 | 960 | 1128 | 910 | 805 | — |
| Tensile at break, psi | 1350 | 1075 | 1275 | 965 | 1040 | 565 |
| Elongation at break, % | 265 | 260 | 275 | 240 | 335 | 170 |
| Die C Tear at 23° C. Lbs/inch | 208 | 195 | 192 | 203 | 187 | 126 |

*Sulfur cured EPDM membrane

In conclusion, it should be clear from the foregoing examples and specification disclosure that the use of EPDM, EPR or other olefin type polymers, having high ethylene content, high crystallinity and high molecular weight to prepare sheet material for roofing allows such sheet material to be seamed along the edge areas, using sufficient pressure and heat, without the use of adhesives. Moreover the sheet materials do not require special curing ingredients nor do they require that a dusting or release agent be applied to the surface of the membrane followed by autoclave curing. It is to be understood that the invention is not limited to the specific types of EPDM exemplified herein or by the disclosure of other typical EPDM, EPR or other olefin type polymers provided herein, the examples having been provided merely to demonstrate the practice of the subject invention. Those skilled in the art may readily select other EPDM, EPR or other similar olefin polymers including copolymers of ethylene and butene and ethylene and octene, according to the disclosure made hereinabove. Similarly, the invention is not necessarily limited to the particular fillers and processing material exemplified or the amounts thereof.

Thus, it is believed that any of the variables disclosed herein can readily be determined and controlled without departing from the scope of the invention herein disclosed and described. Moreover, the scope of the invention shall include all modifications and variations that fall within the scope of the attached claims.

What is claimed is:

1. A self-adhering, single layered, heat seamable roofing sheet consisting essentially of an uncured polymeric composition of matter comprising:
   100 parts by weight of a semi-crystalline polymer having more than about 2 percent by weight crystallinity and selected from the group consisting of polyolefins prepared from monomers having at least 2 carbon atoms, said polymer having an ethylene content in excess of 75 percent, a number average molecular weight of at least 30,000 and a weight average molecular weight of at least 100,000;
   from about 20 to 300 parts by weight of a filler selected from the group consisting of reinforcing and non-reinforcing fillers and mixtures thereof per 100 parts of said polymer; and
   from about 60 to 150 parts by weight of a processing material selected from the group consisting of paraffinic oils, naphthenic oils and waxes and mixtures thereof, per 100 parts of said polymer, said roofing sheet exhibiting a peel adhesion value of at least about 2 pounds/inch and a shear adhesion value of at least about 15 pounds/square inch wherein seaming is achieved in the absence of an adhesive.

2. A self-adhering heat seamable sheet material, as set forth in claim 1, wherein said polymer comprises EPDM having an ethylene content of 75 percent by weight, a weight average molecular weight of about 190,000 and about 14.6 percent by weight crystallinity.

3. A self-adhering heat seamable sheet material, as set forth in claim 2, wherein said filler comprises about 130 parts by weight of carbon black and said composition of matter includes about 85 parts by weight of said processing material.

4. A self-adhering heat seamable sheet material, as set forth in claim 1, wherein said polymer comprises EPDM having an ethylene content of about 82 percent by weight, a weight average molecular weight of 222,000 and about 2.3 percent by weight crystallinity.

5. A self-adhering heat seamable sheet material, as set forth in claim 4, wherein said filler comprises about 130 parts by weight of carbon black and said composition of matter includes about 85 parts by weight of said processing material.

* * * * *